(12) United States Patent
Garretson (10) Patent No.: US 6,230,730 B1
(45) Date of Patent: May 15, 2001

(54) CONTAINER HAVING COLLAPSIBLE INLINE FLUID-WEIGHT CONTROL DEVICE

(76) Inventor: Owen L. Garretson, 500 E. La Plata St., Farmington, NM (US) 87401

( * ) Notice: Subject to any disclaimer, the term of this patent is extended or adjusted under 35 U.S.C. 154(b) by 0 days.

(21) Appl. No.: 09/503,392

(22) Filed: Feb. 14, 2000

(51) Int. Cl.[7] .......................... F16K 31/22; F16K 31/383; F16K 31/385
(52) U.S. Cl. .............................. 137/2; 137/403; 137/413; 137/430; 141/1; 141/198; 222/55; 222/67
(58) Field of Search .............................. 137/1, 2, 38, 43, 137/44, 403, 413, 414, 430, 416, 425, 449; 141/1, 4, 5, 198; 222/55, 57, 64, 67

(56) References Cited

U.S. PATENT DOCUMENTS

| 2,731,030 | 1/1956 | Phillips et al. ........................ 137/413 |
| 3,055,386 | 9/1962 | Moore ................... 137/403 |
| 3,640,320 | 2/1972 | Elkuch ................... 137/588 |
| 3,749,141 | 7/1973 | Garretson ................... 141/5 |
| 3,929,155 | 12/1975 | Garretson ................... 141/198 |
| 4,064,907 | 12/1977 | Billington et al. ................... 141/198 |
| 4,305,422 | 12/1981 | Bannink ................... 141/198 |
| 4,360,038 | 11/1982 | Trinkwalder, Jr. ................... 141/198 |
| 4,444,230 | 4/1984 | Van Mullem ........... 137/430 |
| 4,635,480 | 1/1987 | Hrncir et al. ........................ 137/416 |
| 5,048,557 | 9/1991 | Campau ................... 137/414 |
| 5,090,442 | 2/1992 | Campau ................... 137/414 |
| 5,246,045 | 9/1993 | Clothier et al. ........................ 141/198 |
| 5,282,496 | 2/1994 | Kerger ................... 141/198 |
| 5,460,197 | 10/1995 | Kerger et al. ........................ 137/413 |
| 5,472,012 | 12/1995 | Wood et al. ........................ 141/198 |
| 5,487,404 | 1/1996 | Kerger ................... 141/198 |
| 5,829,465 | 11/1998 | Garretson ................... 137/2 |
| 5,887,609 | 3/1999 | Garretson ................... 137/2 |

*Primary Examiner*—George L. Walton
(74) *Attorney, Agent, or Firm*—Donald R. Schoonover (57) ABSTRACT

A device, and a container having such a device, is provided for filling the container with a predetermined weight of fluid. The device includes an input portion with a throat and a shoulder for introducing fluid into the container. A shut-off mechanism has a shut-off member and a control port. A control mechanism maintains one or more spheres in an inline configuration with the shut-off member such that fluid flow is permitted between the shut-off member and the control port as the device is disposed in an open configuration. A stabilizer is provided for each of the one or more spheres to maintain the inline configuration. As the fluid contained in the container reaches a predetermined weight, a displacer becomes buoyant and lifts the stabilizers with a destabilizer mechanism, which allows the one or more spheres to move transversely, causing the inline configuration to collapse and allowing the shut-off member to settle against the control port to establish a fluid-tight sealing engagement therewith, whereupon the upper surface is displaced such that a fluid-tight sealing engagement is established between the upper surface and the shoulder, shutting off filling of the container. One or more nudgers may be provided to assist with collapsing of the inline configuration. A method of practicing the invention is also provided.

28 Claims, 3 Drawing Sheets

CONTAINER HAVING COLLAPSIBLE INLINE FLUID-WEIGHT CONTROL DEVICE

BACKGROUND OF THE INVENTION

1. Field of the Invention.

This invention relates generally to fill valves and containers for containing fluids and, more particularly but without limitation, to fill valves and containers for containing fluids such as propane, butane, and the like.

2. Description of the Related Art.

A common occurrence is the filling of containers with fuel or other fluids, such as portable propane tanks for barbecue equipment for example. A common procedure for filling such a tank, wherein the weight of the tank is generally visibly stamped on its outer surface, is to place the tank on scales set at a particular weight, such as twenty pounds plus the empty or tare weight of the tank. As the tank is being filled, someone watches the scales; when the balance indicates that the weight of the tank and its contents is equal to the setting on the scales, filling of the tank is terminated.

Presumably, the tank then holds the desired twenty pounds of fluid. Unfortunately, that may not be the case. For instance, the weight stamped on the tank may not be equal to the weight that would be observed if the tank were totally empty. If the tank has mud or other debris adhering thereto such that the stamped weight is less than the empty weight of the tank at the time of filling, the patron will get less than his money's worth because he will be paying for propane that he is not receiving, namely the weight of propane equal to the weight of the debris. Further, the scales may not be properly calibrated or balanced, or the scales may be set at a reading of less than tare weight plus twenty pounds, particularly if the patron is not positioned whereby the filling attendant's activities can be closely observed. As a result, the patron may again be getting less than his money's worth.

Conversely, a careless or over-busy attendant may permit a patron to fill his own tank. In that situation, the patron may be tempted to get more than his money's worth and introduce more than twenty pounds of propane into the tank, which may present a serious safety problem. The volumes of many fluids, such as butane, propane, etc., are temperature dependent. For example, the volume of a given weight of propane increases approximately one percent for each temperature increase of approximately 5–6° F. Thus, as the temperature of propane increases, the weight or mass of propane that can be placed in a given volume at a given pressure decreases. By the same token, the pressure of a given weight of a temperature-dependent fluid placed in a closed container at a given temperature may substantially increase as the temperature of the fluid increases.

As a more specific example, the pressure of liquid/vapor phase propane at –44° F. is approximately zero psig and at 100° F. is approximately 172 psig, or a pressure change of 172 psig for a temperature change of 144° F. However, a temperature increase of 1° F. in liquid-phase only propane may cause a pressure increase in excess of 500 psig.

Therefore, what is needed is a device, and a container having such a device, that determines a certain "filled" condition of the container as fluid is being introduced thereinto by detecting the containment of a predetermined weight of fluid in the container; that automatically prevents further filling of the container beyond such a "filled" condition; that prevents further filling of the container beyond such a "filled" condition even though conduct to thwart such a device is attempted by inducing inertial effects therein; that is substantially independent of the composition, pressure, and/or temperature of the fluid being introduced into and/or contained by the container; that is immune to errors in scales or tare weight of the container; that prevents introduction of fluid into the container unless the container has a essentially upright orientation; and that controls flow into the container with a pressure that has a substantially smaller magnitude than the pressure at which fluid is being introduced into the container.

SUMMARY OF THE INVENTION

An improved device, and an improved container having such a device, is provided for automatically controlling the weight of fluid introduced into the container. The device includes body structure for mounting the device to the container; a fluid-weight control mechanism including a fluid-weight detection mechanism for detecting and controlling a predetermined weight of fluid contained in the container; and a shut-off mechanism, responsive to the fluid-weight detection mechanism, configured to automatically prevent introduction of additional fluid into the container as the container contains the predetermined weight of the fluid.

The device has body structure having an input portion with a throat and a shoulder leading into a distribution cavity and one or more ports that provide fluid flow communication to the container cavity.

The shut-off mechanism has an axially displaceable partition mechanism with an upper surface. The upper surface and the shoulder are configured such that a sealing member can form a fluid-tight sealing engagement therebetween. A small port allows fluid from the throat to enter a shut-off cavity of the partition mechanism.

The fluid-weight control mechanism includes a control chamber having a shut-off member superimposed over a control port. A guide member is spaced about the shut-off member to maintain the shut-off member in alignment with the control port while permitting unhindered axial displacement of the shut-off member. The fluid-weight control mechanism also includes a trigger chamber containing one or more spheres.

The trigger chamber contains a stabilizer for each of the one or more spheres to maintain the spheres in alignment with the shut-off member as the device is disposed in a fill or open configuration. As the one or more spheres are maintained in the inline configuration with the shut-off member 143, the shut-off member is sufficiently spaced apart from the control port such that fluid can flow therebetween.

The fluid-weight detection mechanism includes a displacer that becomes buoyant as the container contains a weight of fluid that is slightly smaller in magnitude than the weight of fluid predetermined to constitute a "filled" condition of the container. As the displacer becomes buoyant, one or more destabilizers extending axially from the displacer lift the stabilizers from the one or more spheres, allowing them to move transversely such that the inline configuration with the shut-off member collapses. Nudgers secured to the displacer may be provided to assist with such collapsing of the inline configuration. As the inline configuration collapses, the shut-off member settles against, and establishes a fluid-tight sealing engagement with the control port, preventing further fluid flow from the shut-off cavity. As a result, fluid pressure builds up in the shut-off cavity, forcing the partition mechanism upwardly such that the fluid-tight sealing engagement is formed between the upper surface and the shoulder by the sealing member, thereby shutting off fluid flow from the throat to the distribution cavity.

The displacer extends substantially the entire vertical spacing within the container as the container assumes an upright orientation. A spring member operably offsets a portion of the weight of the displacer such that the displacer is buoyant as the container assumes an upright orientation and the container contains the predetermined weight of the fluid. In addition, the fluid-weight control mechanism is configured to prevent introduction of fluid into the container as the container assumes a non-upright orientation even though the container may not contain the predetermined weight of the fluid.

The improvement includes a method for practicing the invention.

PRINCIPAL OBJECTS AND ADVANTAGES OF THE INVENTION

The principal objects and advantages of the present invention include: providing a device for preventing further filling of a container wherein the container contains a predetermined weight of fluid or fluids, and/or a container having such a device; providing such a device and/or a container having a collapsible inline control mechanism; providing such a device and/or a container wherein such "filled" condition of the container is substantially temperature independent; providing such a device and/or a container wherein such "filled" condition of the container is independent of the density of the fluid or fluids contained in the container; providing such a device and/or a container wherein filling of the container is substantially immune to inertial effects generated in an attempt to fill the container beyond the "filled" condition of the container; providing such a device and/or a container wherein introduction of fluid into the container is prevented as the container assumes a non-upright orientation; and generally providing such a device and/or a container which is economical to manufacture, effective in operation, reliable in performance, capable of long operating life and particularly well adapted for the proposed usage thereof.

Other objects and advantages of the present invention will become apparent from the following description taken in conjunction with the accompanying drawings, which constitute a part of this specification and wherein are set forth exemplary embodiments of the present invention to illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 10 generally refers to either a fluid-weight control device 13 or a container 15 having such a fluid-weight control device 13, in accordance with the present invention, as shown in FIGS. 1 through 6. The device 13 comprises body structure 17, a fluid-weight control means 23 including predetermined fluid-weight detection mechanism 25, and a shut-off mechanism 27.

The body structure 17 generally includes an input portion 33, an intermediate portion 35, and a tail portion 37, as hereinafter described. The input portion 33 generally includes container connection means 43, such as a threaded arrangement 43 for attachment to a tank, cylinder, vessel or other suitable container 45 having a mated tapped throughbore 47, or other suitable arrangement. It is to be understood that the present invention is not limited to applications for propane or butane but is applicable to a multitude of different container structures for a multitude of different fluids and mixtures thereof, i.e. liquids and gases, such as iso-butane, propane/butane, saltwater, etc., for example.

Figures 1, 2, 6:
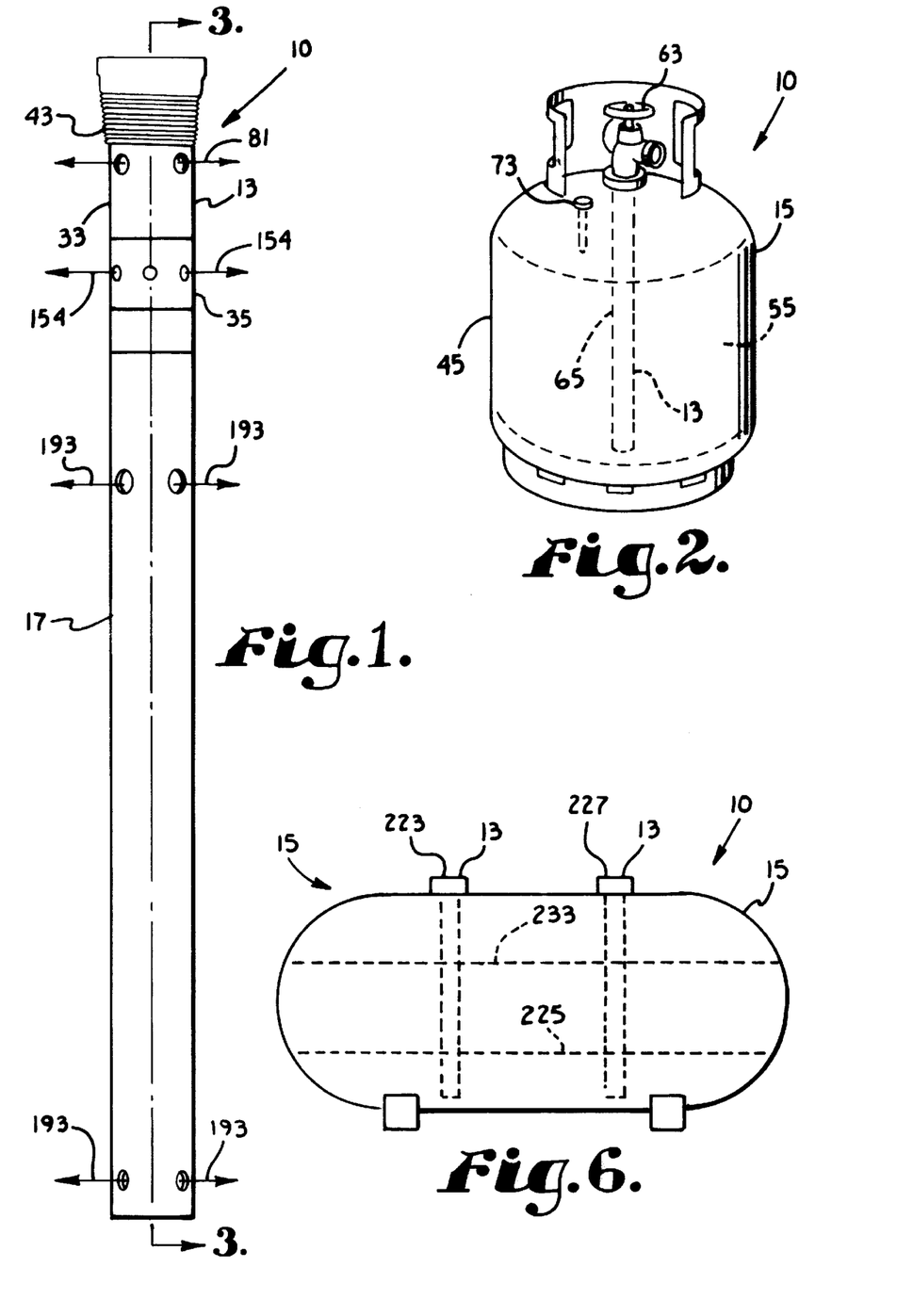
FIG. 1 is a side elevational view of a device having a collapsible inline fluid-weight control mechanism for a container, according to the present invention.
FIG. 2 is a perspective view of a container having such a device with a collapsible inline fluid-weight control mechanism, according to the present invention.
FIG. 6 is a schematic representation of a container having two of the devices having collapsible inline fluid-weight control mechanisms, according to the present invention.

The input portion 33 generally has an axially extending input channel 53 for receiving fluid therethrough for introduction into a container cavity 55 of the container 45. The input portion 33 has connecting means 57, such as an internally or externally threaded surface as appropriate, for connecting to an external fitting, such as a hose and adapter, for transferring fluid from a source (not shown) to the container 45. For example, the input portion 33 may comprise a manual shut-off valve 63, such as that found on some twenty-pound capacity propane containers commonly used with barbecue equipment, wherein the input channel 53 is angled to one side, perpendicularly to an axis 65, as shown in FIG. 2. In addition, the input portion 33 may include a pressure release valve 67, such as that schematically shown in phantom lines in FIG. 3, with a passageway to the upper vapor space of the container cavity 55 of the container 45, and/or a liquid level detector 73 configured to check the liquid level of the fluid contained in the container 45, as commonly known in the art.

Figures 3, 4:
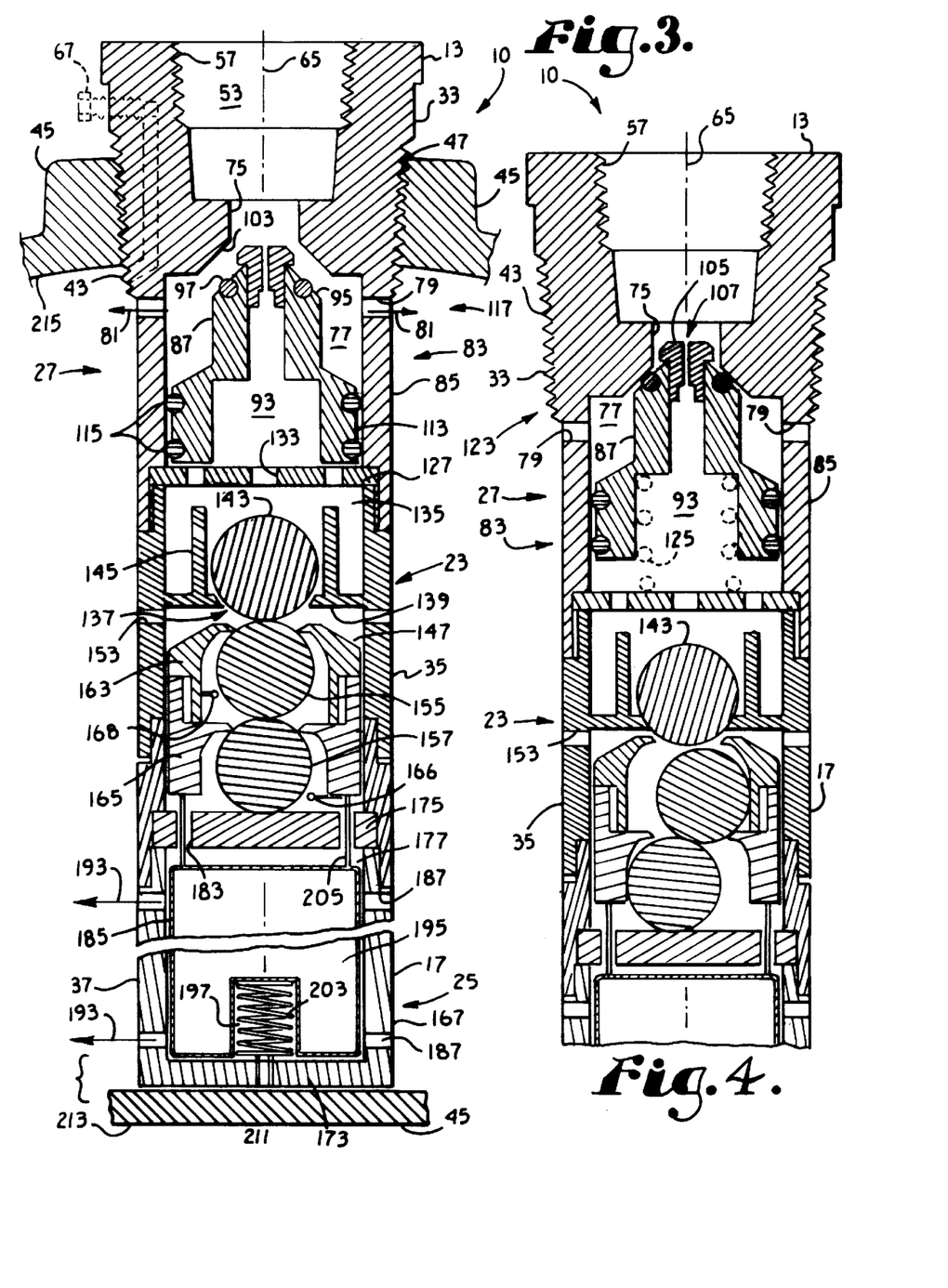
FIG. 3 is an enlarged longitudinal and fragmentary, partially schematic, cross-sectional view of the device having a collapsible inline fluid-weight control mechanism taken along line 3—3 of FIG. 1, showing the device in an open configuration.
FIG. 4 is an enlarged longitudinal and fragmentary, partially schematic, cross-sectional view of the device have a collapsible inline fluid-weight control mechanism, similar to that shown in FIG. 3 but showing the device in a closed configuration.

It is to be understood that the pressure relief valve 67 may be an integral part of the device 13 as shown in FIG. 3 or, alternatively, may be a part of the container 45 and separated from the device 1. It is also to be understood that the liquid level detector 73 may be part of the container 45 and separated from the device 13 as shown in FIG. 2 or, alternatively, may be an integral part of the device 13. The input portion 33 includes a throat 75 leading into a distribution cavity 77, which is generally arranged symmetrically about the axis 65. One or more ports 79 provide fluid flow communication from the distribution cavity 77 to the container cavity 55, as indicated by the arrows designated by the numeral 81 in FIG. 3.

The shut-off mechanism 27 includes a partition mechanism 83 configured to be axially displaceable along the axis 65 within an outer wall 85 of the input portion 33. The partition mechanism 83 includes a thimble member 87 having a shut-off cavity 93, as shown in FIG. 3. The thimble member 87 has a sloped upper surface 95 with a sealing member 97, such as an O-ring 97, or precision machined brass ring 97, or other suitable arrangement, embedded therein. The upper surface 95 and the sealing member 97 are configured to form a fluid-tight sealing engagement with a shoulder 103 of the body structure 17, as shown in FIG. 4 and as hereinafter described, to thereby appropriately prevent fluid from flowing from the throat 75 to the distribution cavity 77 as the container 45 assumes a "filled" or "full" condition. It is to be understood that "filled" or "full" as used herein means that the container 45 contains a desired, predetermined weight of fluid or fluids even though such predetermined weight represents a quantity of the fluid or fluids that may be less than the quantity corresponding to the full condition recommended by the container manufacturer.

It is to be understood that the sealing member 97 may be embedded in the upper surface 95 as described or, alternatively, the sealing member 97 may be embedded in the shoulder 103. It is foreseeable that a portion of the sealing member 97 may be embedded in the upper surface 95 and another portion of the sealing member 97 may be embedded in the shoulder 103, such as applications wherein the sealing member 97 comprises a pair of O-rings 97 for example.

An upper portion 105 of the thimble member 87 has a port 107 formed axially therethrough. The upper portion 105 may be a separate component removably secured to the thimble member 87 as shown in FIG. 3 or, alternatively, the thimble member 87 may have a closed upper end with the port 107 formed therethrough. The diametric dimension of the port 107 is substantially smaller than the transverse dimensions of the throat 75 and the effective cross-sectional spacing between the upper surface 95 and the shoulder 103, which is configured to allow substantial fluid flow from the throat 75 through the distribution cavity 77 and the ports 79 as the container 45 is being filled. As a result, the volume of fluid flowing through the port 107 is always minimal in comparison to the volume of fluid flowing through the ports 79 as the container 45 is being filled.

The thimble member 87 generally includes a flared portion 113. A sealing mechanism 115, such as one or more O-rings 115, isolates the shut-off cavity 93 from the distribution cavity 77 by preventing fluid flow around the thimble member 87 from the distribution cavity 77 as the container 45 is being filled.

The partition mechanism 83 is configured such that as the pressure of fluid within the shut-off cavity 93 is substantially less than the pressure of fluid within the throat 75 and the distribution cavity 77, the upper surface 95 will be spaced apart from the shoulder 103 such that a fluid-tight sealing engagement is not established by the sealing member 97 between the upper surface 95 and the shoulder 103 and fluid can freely pass from the throat 75 to the distribution cavity 77, sometimes referred to herein as a fill or open configuration 117, as shown in FIG. 3. On the other hand, the partition mechanism 83 is also configured such that as the magnitude of the fluid pressure with the shut-off cavity 93 approaches that of the fluid pressure within the throat 75 and the distribution cavity 77, the thimble member 87 is displaced such that the upper surface 95 is spaced sufficiently closely to the shoulder 103 that a fluid-tight sealing engagement is established between the upper surface 95 and the shoulder 103 by the sealing member 97, and fluid is thereby prevented from flowing from the throat 75 to the distribution cavity 77, sometimes referred to herein as a closed configuration 123, as shown in FIG. 4.

In other words, as the device 10 assumes the closed configuration 123, the transverse dimensions of, and therefore the effective cross-sectional area exposed to fluid pressure urging the partition mechanism 83 toward the throat 75 are substantially greater than the opposing transverse dimensions and corresponding fluid pressure of the throat 75.

If desired for some applications, a spring member 125, shown in phantom lines in FIG. 4, may be utilized to assist with establishing the fluid-tight sealing engagement of the sealing member 97 between the upper surface 95 and the shoulder 103 as the device 10 assumes the closed configuration 123. The force provided by the spring member 125, however, must be such that the spacing relationship between the upper surface 95 and the shoulder 103 can operably assume the open configuration 117 as the fluid pressure in the shut-off cavity 93 is substantially less than the fluid pressure in the distribution cavity 77.

The fluid weight control means 23 is generally housed within the intermediate portion 35, which is spaced adjacently to, and aligned generally coaxially with, the input portion 33. A partition wall 127 is spaced between the components contained within the input portion 33 and the components contained within the intermediate portion 35. One or more ports 133 through the partition wall 127 permits fluid contained within the shut-off cavity to freely flow into a control chamber 135 of the intermediate portion 35. Other than the ports 133, the only outlet from the control chamber 135 is a control port 137 formed in a bottom wall 139 of the control chamber 135. Superimposed above the control port 137 is a shut-off member 143. Preferably, the shut-off member 143 is constructed of durable material, such as stainless steel or other suitable material.

The shut-off member 143 and the control port 137 are configured to establish a fluid-tight seal therebetween as the shut-off member 143 abuttingly engages the control port 137. Preferably, the shut-off member 143 is spherical; for some applications, however, it is to be understood that other precision-machined configurations may be used to establish the desired fluid-tight sealing engagement. A guide member 145, spaced about the shut-off member 143, is configured to permit unhindered axial displacement of the shut-off member 143 along the axis 65 and to maintain the shut-off member 143 in alignment with the control port 137 to thereby attain the aforesaid fluid-tight sealing engagement.

The fluid weight control means 23 also includes a trigger chamber 147 spaced axially from, and immediately adjacent to, the control chamber 135. One or more ports 153 provide fluid flow communication between the trigger chamber 147 and the container cavity 55, as indicated by the arrows designated by the numeral 154 in FIG. 5. Contained within the trigger chamber 147 are a first sphere 155 and a second sphere 157. Preferably, the spheres 155, 157 are constructed of a durable material, such as stainless steel or other suitable material.

Also contained within the trigger chamber 147 are a first stabilizer 163 and a second stabilizer 165 for respectively maintaining the first sphere 155 and the second sphere 157 in alignment with the shut-off member 143 as the device 10 is disposed in the open configuration 117, sometimes referred to herein as being "inline". The stabilizers 163, 165 generally have an open, cage-like or spider-like configuration such that fluid can freely pass vertically through the trigger chamber 147. Preferably, the stabilizers 163, 165 are constructed of light-weight material, such as an appropriate plastic, aluminum, or other suitable material. As the first sphere 155 and the second sphere 157 are maintained in alignment with the shut-off member 143, the shut-off member 143 is sufficiently spaced apart from the control port 137 such that capacity for fluid flow between the shut-off member 143 and the control port 137 is much greater than the capacity for fluid flow through the port 107.

Figure 5:
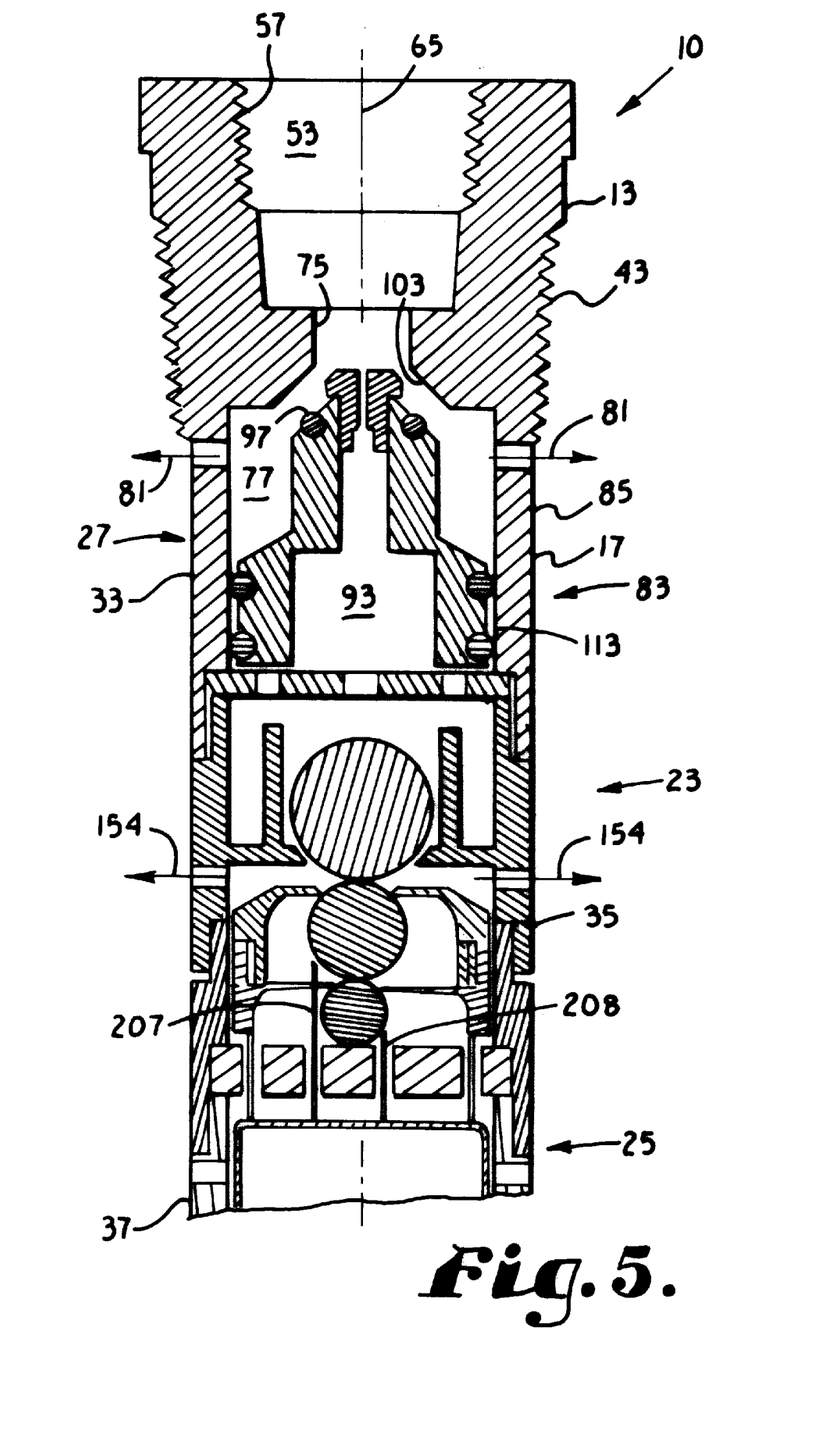
FIG. 5 is an enlarged longitudinal and fragmentary, partially schematic, cross-sectional view of the device having a collapsible inline fluid-weight control mechanism, similar to that shown in FIG. 3 but showing a variation of a triggering mechanism thereof.

In other words, as the first sphere 155 and the second sphere 157 are maintained by the first stabilizer 163 and the second stabilizer 165, a stable inline configuration exists among, the shut-off member 143, the first sphere 155 and the second sphere 157, as shown in FIGS. 3 and 5. However, if the stabilizers 163, 165 become elevated relative to their respective spheres 155, 157 such that stable alignment of the spheres 155, 157 is no longer provided by the stabilizers 163, 165, the inline configuration collapses, and the spheres 155, 157 move sidewise relative to the shut-off member 143 and to each other, as shown in FIG. 4. As a result, the shut-off member 143 is no longer supported by the spheres 155, 157 allowing the shut-off member 143 to settle downwardly against the control port 137, thereby establishing a fluid-tight sealing engagement between the shut-off member 143 and the control port 137 and thereby preventing further escape of fluid from the control chamber 135.

If desired for some applications, a nudger 166 secured to the stabilizer 165 may be utilized to nudge the sphere 157 sidewise, to the left as shown in FIG. 3, to promote collapse of the inline configuration as the stabilizer 165 is lifted from the sphere 157. Alternatively or in addition, a nudger 168 secured to the stabilizer 163 may be utilized to nudge the sphere 155 sidewise, to the right as shown in FIG. 3, to promote collapse of the inline configuration as the stabilizer 163 is lifted from the sphere 155.

For some applications, it may be desirable that the spheres 155, 157 be approximately the same size but smaller than the shut-off member 143, as shown in FIG. 3. For other applications, it may be desirable for one of the spheres 155, 157 to be larger than the other, such as sphere 155 being larger than sphere 157, as shown in FIG. 5. It is to be understood that each of the spheres 155, 157 and the shut-off member 143 may be sized or have a curvature that is greater, lesser, or equal to that of each or both of the others, which is within the nature and scope of the present invention.

Preferably, the device 13 comprises the two spheres 155, 157 in the trigger chamber 147. It is foreseen for some applications, however, that a single sphere may provide the function provided by the spheres 155, 157 as described herein. In that event, a similar collapsible inline fluid-weight controlling feature along the axis 65 would apply. It is also foreseen that some applications may utilize the spheres 155, 157 in conjunction with the shut-off member 143 to attain the inline configuration as described herein, but with the axis of that inline configuration angularly offset from the axis 65. Of course, the function provided by the collapse of such an angularly offset inline configuration would still apply.

The tail portion 37 has a cylindrically shaped outer wall 167 extending from the intermediate portion 35 to a distal member 173. An inner wall 175 separates the trigger chamber 147 from a tail cavity 177 of the tail portion 37. One or more orifices 183 provide fluid flow communication between the trigger chamber 147 and the tail cavity 177.

The fluid-weight detection mechanism 25 of the fluid-weight control mechanism 23 includes a float or displacer 185 spaced within the tail cavity 177. Ports 187 situated near each end of the displacer 185 provide fluid flow communication between the tail cavity 177 and the container cavity 55, as indicated by the arrows designated by the numeral 193 in FIG. 3. The displacer 185 is constructed of light-weight material, such as aluminum or other suitable material. The displacer 185 has an outside diameter that is dimensioned slightly smaller than the inside diameter of the outer wall 167 such that the displacer 185 can be slidably displaced along the axis 65 within the outer wall 167. Such an arrangement assures that the frictional forces generated between the displacer 185 and the outer wall 167 by gravitational components arising from the weight of the displacer 185 are minimal, particularly since the spacing between the displacer 185 and the outer wall 167, although minimal, is sufficient to allow fluid therebetween to serve as a lubricant for longitudinal displacement of the displacer 185 within the outer wall 167. The displacer 185 has a sealed displacer cavity 195 that is configured such that the displacer 185 becomes buoyant as the container 45 contains a weight of fluid that is slightly smaller in magnitude than the weight of fluid predetermined to constitute a "filled" condition of the container 45.

The displacer 185 generally has an axially situated spring member cavity 197 formed in an outer surface thereof such that a spring member 203 is mountable therein between the displacer 185 and the distal member 173. The spring member 203 is configured such that the axial force exerted by the spring member 203 on the displacer 185 causes the displacer 185 to become buoyant as the weight of fluid in the container 45 satisfies a "filled" condition as the container 45 assumes a normal operating orientation, sometimes referred to herein as an upright orientation. As a result, the displacer 185 generally abuts the distal member 173 as the weight of the fluid in the container 45 is less than that required to place the container 45 in a "filled" condition as the container 45 assumes an essentially upright orientation. If, however, the container 45 should be tilted from such an essentially upright orientation such that the thrust provided by the spring member 203 exceeds the gravitational weight component of the displacer 185 along the axis 65, then the spring member 203 will responsively displace the displacer 185 axially along the axis 65.

As the displacer 185 is so displaced, one or more fingers or destabilizers 205 extending longitudinally upward from the displacer 185, such as through the orifices 183, are configured to lift the stabilizers 163, 165 from their corresponding spheres 155, 157, thereby allowing the shut-off member 143 to settle against the control port 137 and establish a fluid-tight sealing engagement therewith, thereby preventing fluid from being introduced into the container cavity 55 as the container 45 is inclined from an essentially upright orientation, such as being tilted, lying horizontally, etc.

For some applications, it may be desirable to provide nudgers 207, 208 secured to the displacer 185, as shown in FIG. 5, to promote the collapse of the inline feature of the shut-off member 143 and the spheres 155, 157 as the destabilizers 205 lift the stabilizers 163, 165 from the spheres 155, 157. For applications where the sphere 157 is not smaller than the sphere 155 as shown in FIG. 5, the nudger 207 may be constructed to curve around the sphere 157 to accomplish the same nudging objective, such as the nudgers 166, 168 shown in FIG. 3. The nudgers 207, 208 are configured and spaced such that they do not interfere with the spheres 155, 157 as the spheres 155, 157 are transversely displaced during the collapse of the inline feature as described herein.

Preferably, the displacer 185 has an axial length that is slightly less than the axial length of the tail cavity 177 such that the axial distance that the displacer 185 is displaced from resting against the distal member 173 to establish the fluid-tight sealing engagement described herein is minimal. If desired, an adjusting mechanism 211 may be provided to increase or decrease the thrust of the spring member 203 to allow for minor manufacturing deviations.

Preferably, the displacer 185 extends from near a bottom wall 213 of the container 45 to near a top wall 215 of the container 45. In addition, the displacer 185 preferably has a differential buoyancy characteristic that corresponds to variations in the horizontal cross-sectional areas of the container cavity 45. An important feature of the present invention is that the device responds to density of fluid in the vapor phase as well as to density of fluid in the liquid phase, including, of course, vapor existing simultaneously in both the liquid and vapor phases. In other words, the buoyancy contributed by a horizontal slice of the displacer 185 is directly proportional to the corresponding horizontal cross-sectional area of the container cavity 55. The differential buoyancy contributed to the total buoyancy of the displacer 185 at a given level in the container 45 whereat the horizontal cross-sectional area of the container cavity 55 is a certain magnitude is greater or lesser than the differential buoyancy contributed at another level whereat the horizontal cross-sectional area of the container cavity 55 is greater or lesser, the difference in differential buoyancy generally being in direct proportion to the difference in horizontal cross-sectional area of the container cavity 55 at those two levels. As a result, errors arising from the shape of the container 45 and from the level of fluid in the container 45 at the "filled" condition are substantially reduced or entirely eliminated.

In other words, if the container 45 is cylindrically shaped with a uniform horizontal cross section and horizontal top and bottom walls, the displacer 185 of the present invention may also be cylindrically shaped with a uniform horizontal cross section. However, if the container 45 does not have a uniform horizontal cross section, then the horizontal cross section of the displacer 187 should vary accordingly to obtain desired "filled" accuracy, particularly with regard to fluids present in the container 45 in both the liquid and vapor phases.

Thus, it is to be understood that the configuration of the device of the present invention for a particular application is dependent upon the volume and shape of the container 45. More specifically, one of the devices designed for a first container 45 having a given volume and shape but installed on a second container 45, having a different volume and/or shape, will not necessarily shut-off filling of the second container 45 at the same fluid weight at which it would shut off filling of the first container 45.

In an application of the present invention wherein a fluid or fluids are to be introduced into a container 45 and assuming the container has not assumed a "filled" condition, the container 45 is placed in an upright orientation as shown in FIG. 2 and a nozzle (not shown) from a source of the fluid is attached to the input portion 33. The fluid is generally supplied to the input portion 33 at an elevated pressure —200–350 psi, for example —which is substantially greater than normal vapor pressures within the container cavity 55. The fluid from the source flows through the input channel 53 and the throat 75, into the distribution cavity 77, and out through the ports 79 into the container cavity 55.

As the fluid flows from the (unshown) source into the container cavity 55, some of the fluid flows through the port 107 into the shut-off cavity 93. If there were no outlet other than the port 107 for the fluid to escape from the shut-off cavity 93, the pressure of the fluid within the shut-off cavity 93 would quickly equalize with the pressure of the fluid in the throat 75 and a fluid-tight sealing engagement would be formed between the upper surface 95 and the shoulder 103 by the sealing member 97, thereby preventing introduction of fluid into the container cavity 55. Until the displacer 185 becomes buoyant or is displaced such that the stabilizers 163, 165 are lifted from the spheres 155, 157, there is, however, another outlet for fluid to escape from the shut-off cavity 93, namely through the ports 137, 153, 183, 193 into the tail cavity 183 and the container cavity 55. The effective flow capacity of the ports 137, 153, 183, 193 is sufficiently greater than the flow capacity of the port 107 that the fluid pressure within the shut-off cavity 93 is generally substantially less than the fluid pressure within the throat 75 and the distribution cavity 77.

As the displacer 185 is displaced axially along the axis 65, either from buoyancy or from urging by the spring member 203, the destabilizer 205 lifts the stabilizers 163, 165 from the spheres 155, 157 such that the inline alignment of the spheres 155, 157 with the shut-off member 143 collapses. As a result, the spheres 155, 157 seek a more stable configuration and are displaced sufficiently transversely such that the shut-off member 143 moves axially along the axis 65 to form a fluid-tight sealing engagement with the control port 137, thereby preventing further fluid flow through the control port 137. As a result, the fluid pressure in the shut-off cavity 93 begins to equalize with the fluid pressure in the throat 75. As the fluid pressure in the shut-off cavity 93 continues to increase such that the fluid pressure therein approaches the fluid pressure in the throat 75, the partition mechanism 83 is forced upwardly such that a fluid-tight sealing engagement is established between the upper surface 95 and the shoulder 103 by the sealing member 97, thereby preventing fluid flow from the input channel 53 to and through the distribution cavity 77 and the ports 79.

For an application wherein the desired weight of fluid contained in the container 45 to provide a "filled" condition is twenty pounds, the displacer 185 has a weight/volume characteristic such that the resilient force of the spring member 203 less the combined weight of the displacer 185 and the stabilizers 163, 165 is equal to the buoyancy provided by the displacer 185 as the container 45, in an essentially upright orientation, contains slightly under twenty pounds of the fluid. In other words, the minimal additional weight of fluid required to place twenty pounds of fluid in the container 45 is just sufficient to overcome minimal frictional forces of the device 10 such that the displacer 185 is buoyed upwardly to thereby start a chain reaction: (i) the stabilizers 163, 165 are lifted from the spheres 155, 157; (ii) the spheres 155, 157 collapse from their otherwise inline alignment with the shut-off member 143; (iii) the shut-off member 143 settles against and establishes a fluid-tight sealing engagement with the control port 137 preventing further fluid flow from the shut-off cavity 93; and (iv) fluid pressure buildup in the shut-off cavity 93 forces the partition mechanism 83 upwardly such that a fluid-tight sealing engagement is formed between the upper surface 95 and the shoulder 103 by the sealing member 97 thereby shutting off fluid flow from the throat 75 to the distribution cavity 77.

Although the weight of fluid in the container cavity 55 at "filled" condition is independent of the density of the fluid in the container 45, the level of the fluid in the container cavity 55 is not so independent. For example, the level of water —which has a density that is greater than the density of propane—needed to establish the fluid-tight sealing engagement between the upper surface 95 and the shoulder 103 by the sealing member 97 is lower than the level of propane needed to establish that sealing engagement. By minimizing the separation of the displacer 185 from both the bottom wall 213 and the top wall 215 of the container 45, and by minimizing the distance the displacer 187 must be displaced in order to establish the fluid-tight sealing engagement, the variance between the weights of different fluids needed to attain the "filled" condition is minimized, even though the densities of the different fluids may be substantially different. In other words, at "filled" condition, the device 10 automatically prevents further introduction of fluid into the container 45 when the container 45 contains the predetermined weight of the fluid, with only minimal error, regardless of whether the container 45 is filled with water or propane, etc.

Similarly, a fluid that has a temperature-dependent density will provide one level of fluid within the container 45 at one given temperature and will provide a different level of fluid within the container 45 at a different temperature. The weight of the fluid in the container 45, however, will be substantially the same regardless of the difference in temperatures as the difference in densities will provide "filled" buoyancy for the displacer 185 at the corresponding fluid level to provide the desired weight of fluid in the container cavity 55. Although the displacer 185 may have a thermal coefficient of expansion which could change the buoyancy characteristics of the displacer 185 at two different temperatures, such change would be negligible in comparison to the temperature-dependent change in density of the fluid in the container 45. Further, for those fluids that are compressible, the "filled" condition provided by the device is independent of pressure.

In the event that a user tries to deceive the device 10 by placing the container 45 in a non-upright orientation and thereby attempt to overfill the container 45, such as by tilting the container 45, or by lying the container 45 horizontally on its side for example, the spring member 203 would displace the displacer 185 along the tail cavity 177 such that the shut-off mechanism 27 causes the sealing member 97 to immediately establish a fluid-tight sealing arrangement as herein described. As a result, the device 10 would prevent fluid from being introduced into the container cavity 55. Similarly, if the user attempts to overfill the container 45 by attempting to deceive the buoyancy characteristics of the displacer 185, such as by subjecting the container 45 to repeated upwardly directed thrusts or by arcuately swinging the container 45 downwardly in at attempt to utilize centrifugal force in combination with gravitational force, such maneuvering would simultaneously affect the compressibility/density of the fluid, thereby substantially rendering such tactics essentially ineffectual.

In other words, the device of the present invention is designed whereby acceleration force components of the fluid from such arcuate swinging of the container 45 are additive to gravitational force components of the fluid in the container 45 which, in turn, contribute to the buoyant forces acting axially along the displacer 185 and thereby offset the acceleration force components generated in the displacer 185 itself from such arcuate swinging of the container 45. As a result, introduction of additional fluid into the container 45 by such tactics is prevented. For example, if an application of the present invention involves filling the container 45 with water, a downwardly arcuate displacement thereof does not change the density of the water which is substantially incompressible; such an arcuate displacement adds to the gravitational component affecting the fluid and therefore contributes to the buoyancy of the displacer 185.

It is foreseen that the container 45 may be configured with two of the devices 10 for some applications wherein two fluids or two mixtures of fluids are to be combined by weight, as schematically shown in FIG. 6. In that event, a first fluid or mixture of fluids would be introduced into the container 45 through a first one of the devices 10, designated by the numeral 223 in FIG. 6. The device 223 would be configured to permit the container 45 to receive or contain up to a predetermined weight of the first fluid, represented by the dotted line designated by the numeral 225. Then, a second fluid or mixture of fluids would be introduced through the other one of the devices 10, designated by the numeral 227 in FIG. 6. The device 227 would be configured to permit the container 45 to contain up to a predetermined total weight for both of the first and second fluids, represented by the dotted line designated by the numeral 233. The same concept can be extended to mixtures by weight of more than two fluids or more than two mixtures or fluids by using a corresponding number of the devices 10. For example, the present invention may be used to cut 100 proof whiskey to 86 proof whiskey.

It is to be understood that while certain forms of the present invention have been illustrated and described herein, it is not to be limited to the specific forms or arrangement of parts described and shown.

What is claimed and desired to be secured by Letters Patent is as follows:

1. A device for introducing fluid into a container, comprising:
   (a) body structure configured to mount to the container;
   (b) a fluid-weight detection mechanism, contained within said body structure, configured to detect a desired weight of the fluid contained in the container; and
   (c) a fluid-weight control mechanism, including a collapsible inline control mechanism and a shut-off mechanism, responsively configured to control introduction of additional fluid into the container as said fluid-weight detection mechanism detects said desired weight of the fluid in the container, said collapsible inline control mechanism including a plurality of inline members wherein said plurality of inline members are aligned in abutting engagement with said shut-off mechanism as said device is disposed in an open configuration and wherein said plurality of inline members are not aligned with said shut-off mechanism as said device is disposed in a closed configuration.

2. The device according to claim 1, wherein:
   (a) said body structure includes an input portion having a shoulder; and
   (b) said shut-off mechanism includes an upper surface; and wherein said device is disposed in said open configuration as the fluid can flow between said shoulder and said upper surface, and wherein said device is disposed in said closed configuration as a fluid-tight sealing engagement is established between said shoulder and said upper surface.

3. The device according to claim 2, further comprising a sealing member configured to establish said fluid-tight sealing engagement between said shoulder and said upper surface.

4. The device according to claim 2, wherein said fluid-weight control mechanism further includes:

(a) a shut-off member; and (b) a control port; and wherein said shut-off member and said control port are spaced apart such that fluid can flow therebetween as said device is disposed in said open configuration, and wherein a fluid-tight sealing engagement is established between said shut-off member and said control port as said device is disposed in said closed configuration.

5. The device according to claim 4, wherein said collapsible inline control mechanism comprises at least one sphere, wherein said at least one sphere forms an inline configuration with said shut-off member as said device is disposed in said open configuration, and wherein said at least one sphere does not form an inline configuration with said shut-off member as said device is disposed in said closed configuration.

6. The device according to claim 5, wherein said at least one sphere comprises two spheres.

7. The device according to claim 6, wherein one of said two spheres is larger than the other.

8. The device according to claim 6, wherein at least one of said spheres is smaller than said shut-off member.

9. The device according to claim 6, wherein each of said two spheres is smaller than said shut-off member.

10. The device according to claim 1, wherein said fluid-weight detection mechanism includes a displacer that extends substantially the entire depth of the container as the container assumes a substantially upright operating orientation.

11. The device according to claim 1, wherein said detector means includes:

(a) a displacer; and (b) a spring member configured to partially offset the weight of said displacer such that said displacer is buoyant as the container assumes a substantially upright operating orientation and the container contains said desired weight of the fluid.

12. The device according to claim 1, wherein said fluid-weight control mechanism is further configured to prevent introduction of fluid into the container as the container is not assuming a substantially upright operating orientation even though the container may not contain said desired weight of the fluid.

13. The device according to claim 1, wherein said fluid-weight detection mechanism is configured to be substantially independent of the temperature of the fluid contained in the container.

14. The device according to claim 1, wherein said fluid-weight detection mechanism is configured to be substantially independent of the density of the fluid contained in the container.

15. The device according to claim 1, wherein said fluid-weight detection mechanism is configured to be substantially independent of inertial effects induced in said fluid-weight detection mechanism in an attempt to introduce additional fluid into the container even though the container contains said desired weight of the fluid.

16. The device according to claim 1, wherein:

a) said body structure includes a tail portion; and b) said fluid-weight detection mechanism includes a displacer configured to slide axially within said tail portion.

17. An apparatus, comprising:

(a) a container having a cavity; and (b) a device having: (1) body structure configured to mount to said container;

(2) a fluid-weight detection mechanism, contained within said body structure, configured to detect a desired weight of the fluid contained in said container; and (3) a fluid-weight control mechanism, including a collapsible inline control mechanism and a shut-off mechanism, responsively configured to control introduction of additional fluid into the container as said fluid-weight detection mechanism detects said desired weight of the fluid in the container, said collapsible inline control mechanism including a plurality of inline members wherein said plurality of inline members are aligned in abutting engagement with said shut-off mechanism as said device is disposed in an open configuration and wherein said plurality of inline members are not aligned with said shut-off mechanism as said device is disposed in a closed configuration.

18. The apparatus according to claim 17, wherein said fluid-weight detection mechanism includes a displacer that extends substantially the entire depth of the fluid in said cavity as said container assumes a substantially upright orientation.

19. The apparatus according to claim 17, wherein said fluid-weight detection mechanism includes:

(a) a displacer; and (b) a spring member configured to operably partially offset the weight of said displacer such that said displacer is buoyant as said container assumes a substantially upright orientation and said container contains said predetermined weight of the fluid.

20. The apparatus according to claim 17, wherein said fluid-weight control mechanism is further configured to prevent introduction of fluid into said cavity as said container assumes a non-upright orientation even though said cavity may contain less weight of the fluid than said predetermined weight of the fluid.

21. The apparatus according to claim 17, wherein said fluid-weight control mechanism is configured to be substantially independent of the temperature of the fluid contained in said cavity.

22. The apparatus according to claim 17, wherein said fluid-weight control mechanism is configured to be substantially independent of the composition of the fluid contained in said cavity.

23. The apparatus according to claim 17, wherein said fluid-weight control mechanism is configured to be substantially independent of inertial effects induced in said fluid-weight detection mechanism in an attempt to introduce additional fluid into said container as said cavity substantially contains said predetermined weight of the fluid.

24. A method of preventing overfilling of a container with fluid, said method comprising the steps of:

(a) introducing the fluid into the container through a device installed through a wall of the container;

(b) detecting a predetermined weight of fluid contained in the container;

(c) responsive to step (b), collapsing an inline control mechanism from an open configuration to a closed configuration, wherein said inline control mechanism includes a plurality of inline members aligned in abutting engagement with a shut-off mechanism in said open configuration and said plurality of inline members are not aligned with said shut-off mechanism in said closed configuration; and (d) responsive to step (c), preventing further introduction of fluid into the container.

25. A device for introducing fluid into a container, comprising:

(a) body structure configured to mount to the container;

(b) a fluid-weight detection mechanism, contained within said body structure, configured to detect a desired weight of the fluid contained in the container; said body structure includes an input portion having a shoulder;

(c) a fluid-weight control mechanism, including a collapsible inline control mechanism and a shut-off mechanism, responsively configured to prevent introduction of additional fluid into the container as said fluid-weight detection mechanism detects said desired weight of the fluid in the container; said shut-off mechanism includes an upper surface; said fluid-weight control mechanism further includes a shut-off member and a control port; said collapsible inline control mechanism comprises at least one sphere; and (d) a stabilizer for each of said at least one sphere; and wherein said device is disposed in an open configuration as the fluid can flow between said shoulder and said upper surface and said device is disposed in a closed configuration as a fluid-tight sealing engagement is established between said shoulder and said upper surface, said shut-off member and said control port are spaced apart such that fluid can flow therebetween as said device is disposed in said open configuration and a fluid-tight sealing engagement is established between said shut-off member and said control port as said device is disposed in said closed configuration, said at least one sphere forms an inline configuration with said shut-off member as said device is disposed in said open configuration and said at least one sphere does not form an inline configuration with said shut-off member as said device is disposed in said closed configuration, and said stabilizer is configured to maintain said inline configuration of said at least one sphere and said shut-off member as said device is disposed in said open configuration and to responsively allow said inline configuration to collapse as said fluid-weight detection mechanism detects the desired weight of the fluid in the container.

26. The device according to claim 25, including at least one destabilizer configured to interact with said stabilizer such that said stabilizer responsively allows said inline configuration to collapse as said fluid-weight detection mechanism detects the desired weight of the fluid in the container.

27. The device according to claim 26, further including at least one nudger configured to assist said at least one sphere to be displaced from said inline configuration with said shut-off member.

28. A device for introducing fluid into a container, comprising:

(a) body structure configured to mount to the container;

(b) a fluid-weight detection mechanism, contained within said body structure, configured to detect a desired weight of the fluid contained in the container;

(c) a fluid-weight control mechanism, including a shut-off mechanism and a collapsible control mechanism comprising a plurality of inline members including at least one sphere, wherein said plurality of inline members form an inline configuration with said shut-off member as said device is disposed in an open configuration wherein fluid is allowed to enter said container, and wherein said plurality of inline members do not form an inline configuration with said shut-off member as said device is disposed in a closed configuration wherein fluid is prevented from entering said container; and (d) a stabilizer for each of said at least one sphere wherein each said stabilizer is configured to maintain respective said at least one sphere in said inline configuration with said shut-off mechanism as said device is disposed in said open configuration, and wherein each said stabilizer is further configured to responsively allow respective said at least one sphere to not maintain said inline configuration with said shut-off mechanism as said fluid-weight detection mechanism detects said desired weight of the fluid in the container to thereby operatively prevent fluid from entering the container.

* * * * *